US012263129B2

(12) United States Patent
Nilsson et al.

(10) Patent No.: US 12,263,129 B2
(45) Date of Patent: Apr. 1, 2025

(54) PATIENT HANDLING APPARATUS

(71) Applicant: Arjo IP Holding Aktiebolag, Malmö (SE)

(72) Inventors: Richard Nilsson, Lund (SE); Jörgen Per Jönsson, Harlösa (SE); Anders Lundquist, Genarp (SE); Jon Backman, Malmö (SE)

(73) Assignee: ARJO IP HOLDING AKTIEBOLAG, Malmö (SE)

( * ) Notice: Subject to any disclaimer, the term of this patent is extended or adjusted under 35 U.S.C. 154(b) by 206 days.

(21) Appl. No.: 18/014,496

(22) PCT Filed: Jun. 17, 2021

(86) PCT No.: PCT/EP2021/066412
§ 371 (c)(1),
(2) Date: Jan. 5, 2023

(87) PCT Pub. No.: WO2022/008193
PCT Pub. Date: Jan. 13, 2022

(65) Prior Publication Data

US 2023/0263679 A1 Aug. 24, 2023

(30) Foreign Application Priority Data

Jul. 6, 2020 (SE) .................................... 2050849-5

(51) Int. Cl.
*A61G 7/10* (2006.01)

(52) U.S. Cl.
CPC ......... *A61G 7/1003* (2013.01); *A61G 7/1019* (2013.01); *A61G 7/1046* (2013.01); *A61G 7/1059* (2013.01)

(58) Field of Classification Search
CPC ...... A61G 7/10; A61G 7/1001; A61G 7/1003; A61G 7/1019; A61G 7/1046; A61G 7/1059
(Continued)

(56) References Cited

U.S. PATENT DOCUMENTS 2,681,455 A 6/1954 Schwartz
5,153,953 A * 10/1992 Sumrall ............... A61G 7/1019 5/81.1 R
(Continued)

FOREIGN PATENT DOCUMENTS

EP 2648671 B1 3/2016
GB 2154201 A 9/1985
(Continued)

OTHER PUBLICATIONS

International Search Report and Written Opinion dated Sep. 2, 2021, issued in corresponding Patent Application No. PCT/EP2021/066412.

*Primary Examiner* — Tuan N Nguyen
(74) *Attorney, Agent, or Firm* — Morgan, Lewis & Bockius LLP

(57) ABSTRACT

A patient handling apparatus (10) comprising abase (30) with a frame (31) and a patient support device (20), the patient support device (20) being movable relative to the base (30). The patient support device (20) is movably mounted to the frame (31) between an upright and an inclined position, in which the patient support device (20) is inclined backwards or forwards in the inclined position relative to the upright position by means of a guiding arrangement (70). The guiding arrangement (70) comprises at least one frame guiding element (72, 84) mounted to the frame (31) and a support guiding element (71) mounted to the patient support device (20).

19 Claims, 3 Drawing Sheets

(58) Field of Classification Search
USPC ........................................ 4/560.1–562.1, 604
See application file for complete search history.

(56) References Cited

U.S. PATENT DOCUMENTS

| | | | |
|---|---|---|---|
| 5,790,995 | A | 8/1998 | Caden et al. |
| 6,793,232 | B1 | 9/2004 | Wing |
| 2006/0220429 | A1 | 10/2006 | Nylander et al. |
| 2014/0137323 | A1 | 5/2014 | Fernie et al. |

FOREIGN PATENT DOCUMENTS

| | | | |
|---|---|---|---|
| GB | 2433925 | A | 7/2007 |
| WO | 2004/098479 | A1 | 11/2004 |

* cited by examiner

PATIENT HANDLING APPARATUS

TECHNOLOGY FIELD

The present invention relates to a patient handling apparatus.

BACKGROUND

Patient handling apparatuses such as lifts, also referred to as patient hoists, are commonly used to raise, lower and transfer patients who are disabled or who otherwise have mobility problems. Two common types of patient lifts are stanchion-mounted lifts, also known as floor lifts. and ceiling lifts. Floor lifts often have a hoist assembly which may be disposed at the upper end of a stanchion or a chair movably mounted to the stanchion. The stanchion has a wheeled base, which allows for the lift to be moved along the ground to different locations.

One common application for a patient handling apparatuses is to transfer patients into and out of a bathtub. This is associated with a number of challenges. The patient has to be seated securely without the risk of falling out, this is particularly important in cases where the patient has a limited balance when seated. Further, the patient has to be lifted high enough over the tub of the rim in order to clear the tub with the patient's feet. In addition, in cases where the patient is elderly and cognitively impaired, it is crucial to avoid a feeling of free falling for the patient. The feeling of free falling is particularly strong when only the backrest of the patient handling backrest is folded and the seat remains horizontal.

Typically, the patient handling apparatus for such an application implements a bath chair, i.e. a chair mounted to the frame or chassis of the patient handling apparatus. The bath chair only allows vertical movements with a fix hip angle, i.e. angle between a back portion and seat portion of the bath chair. In some cases, the patient handling apparatus provides a tilting movement once the chair comes in contact with sloping surfaces of the bath. When the bath chair has been lowered into the chair, the slope of the tub wall has angled the chair correspondingly. The disadvantage with such a bath chair is that it is not possible to adjust the hip angle outside the tub and independently of the height position of the chair.

Another option is to provide the patient handling apparatus with a bath stretcher. Bath stretchers are more suitable for patients requiring more support and are less mobile. Some bath stretches enable a combination of independent height adjustment of the stretcher and a tiltable back rest. Such bath stretches typically implement technology which enables the back rest to be lifted or lowered, either manually or electrically. However, since only the angle of the back rest is reclinable the comfort is lacking.

A number of solutions for adjustment of sitting angles for disabled and specifically for wheelchairs are known in the prior art, for example from U.S. Pat. Nos. 6,793,232, 6,793, 232, 2,681,455, 5,790,995A, GB2154201, GB2433925 and WO2004/098479. There are also many technologies that provides mobile chairs that can be transformed to stretchers and vice versa. Common for both these type of technologies is that they all have a supporting structure underneath the seat of the chair or stretcher. When in use with a bath tube there is no room for such a structure.

In the light of the above, there is a need for a patient handling apparatus which addresses the above mentioned challenges.

SUMMARY

According to one aspect a patient handling apparatus is provided. The patient handling apparatus comprises a base with a frame and a patient support device. The patient support device is movable relative to the base.

The patient support device is movably mounted to the frame between an upright and an inclined position. In the inclined position, the patient support device is inclined backwards or forwards in the inclined position relative to the upright position by means of a guiding arrangement.

The guiding arrangement comprises at least one frame guiding element mounted to the frame. The guiding arrangement further comprises a support guiding element mounted to the patient support device.

The support guiding element is movably connected to the frame guiding element and at least one of the at least one frame guiding element and the support guiding element has a continuously arched portion concave relative the patient support device in the upright position. The continuously arched portion is arranged to guide a relative movement between the support guiding element and the frame guiding element for providing movement of the patient support device between the upright and inclined position.

Further objects and features of the present invention will appear from the following detailed description of embodiments of the invention.

BRIEF DESCRIPTION OF DRAWINGS

The invention will be described with reference to the accompanying drawings, in which.

DETAILED DESCRIPTION

Figure 1:
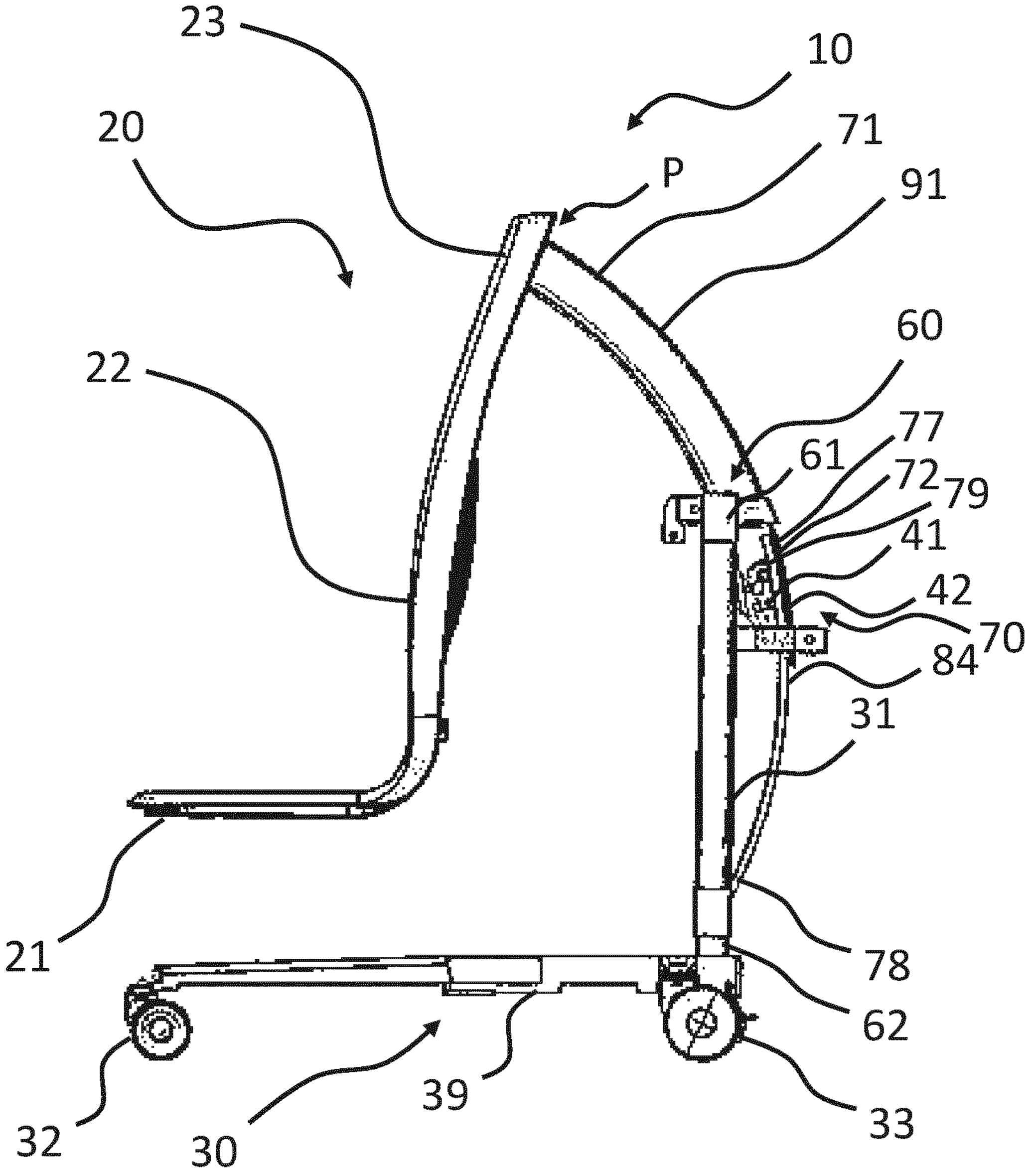
FIG. 1 is a side view of the patient handling apparatus according to an embodiment.

FIG. 1 shows a patient handling apparatus 10. The patient handling apparatus 10 comprises a base 30 with a frame 31. The base 30 may be movable relative the ground. The base 30 may be provided with wheels 32, 33 adapted to allow movement of the base, i.e. the patient handling apparatus 10, relative the ground.

The base 30 may comprise a horizontal portion 39. The frame 31 may extend orthogonally to the horizontal portion. The horizontal portion 39 may be provided with the wheels 32, 33.

The frame 31 may protrude from a position adjacent to an end of the horizontal portion 39. Said frame 31 may further be substantially aligned with one or more of the wheels 33.

The patient handling apparatus 10 comprises a patient support device 20. The patient support device 20 is adapted to support a patient, i.e. support the weight of said patient.

The patient support device 20 is movable relative to the base 30. The patient support device 20 is movably mounted to the frame 31. The patient support device 20 is movable between an upright position and an inclined position. The patient support device 20 is inclined backwards or forwards in the inclined position relative to the upright position by means of a guiding arrangement 70.

An upright position may herein be defined as a position wherein the patient supported by the patient support device 20 is in an upright position. Accordingly, the spine of the patient extends substantially in a vertical direction when supported by the patient support device 20 in the upright position.

An inclined position may herein be defined as a position wherein the patient supported by the patient support device 20 is an inclined position, i.e. an inclined position relative the upright position. The inclined position is thus a position wherein the patient is tilted, i.e. the spine of the patient is tilted, relative a vertical axis of the patient handling apparatus.

The guiding arrangement 70 comprises at least one frame guiding element 72, 84. The at least one frame guiding element 72, 84 is mounted to the frame 31. The guiding arrangement 70 further comprises a support guiding element 71. The support guiding element 71 is mounted to the patient support device 20.

The support guiding element 71 is movably connected to the frame guiding element 72, 84. At least one of the at least one frame guiding element 72, 84 and the support guiding element 71 has a continuously arched portion. The continuously arched portion is concave relative the patient support device 20 in the upright position. Accordingly, the continuously arched portion is concave relative patient support device 20 when the patient support device 20 is in the upright position.

The continuously arched portion is arranged to guide a relative movement between the support guiding element 71 and the frame guiding element 72, 84 for providing movement of the patient support device 20 between the upright and inclined position.

The patient support device 20 may be movable backwards or forwards to the inclined position relative the upright position about a horizontal axis. The horizontal axis may extend through a vertical plane. Thus, the horizontal axis may be extending orthogonally to the vertical plane. The continuously arched portion may extend in said vertical plane. The continuously arched portion may be arranged to guide the relative movement between the support guiding element 71 and the frame guiding element 72, 84 in said vertical plane for providing the movement of the patient support device 20 between the upright and inclined position.

This type of guiding arrangement is associated with a number of advantages. Firstly, it allows for the patient support device to maintain an orientation which provides a natural position for the patient both when the patient support device is in the inclined position and the upright position. Secondly, the tilting movement of the patient support device may be achieved without the need of a support structure underneath the patient support device since the load of the patient support device and patient as well as the guiding arrangement may be concentrated to a vertical frame. This is particularly advantageous in the field of bath chairs and lifts wherein it is of great importance to be able to raise, lower and pivot a patient inside a bath tub or pool. The patient handling apparatus according to the invention allows for all of the required operations without the base obstructing. Also, it makes it possible to adjust the angle of patient support device inside a bath tub which is functionality not provided by conventional patient handling apparatuses.

Notably, the horizontal axis may be defined as a tilt axis of the patient support device 20. The horizontal axis may be arranged to extend through a centrum point of a circular sector formed by the continuously arched portion. Said circular sector may extend in the previously mentioned vertical plane.

Preferably, the patient support device 20 is mounted to the base 30 solely by means of the guiding arrangement 70. Thus, the patient support device 20 is only suspended from the base 30 at the guiding arrangement 70. In other words, the patient support device 20 is only suspended from the base 30 by means of the guiding arrangement 70. Thereby, the space underneath the patient support device may be kept free from structural elements for supporting the patient support device.

A connecting point P formed by the connection between the patient support device 20 and the support guiding element 71 may be movable along a curved trajectory about the horizontal axis. The curved trajectory may be a continuation of the continuously arched portion, i.e. the circular sector. Preferably, the patient support device 20 is mounted to the base 30 solely at the connection point P. The connection point P may be considered a point wherein the patient support device 20 is connected to the support guiding element 71.

Movement of the patient support device backwards from the upright position to the inclined position may be considered a movement along said curved trajectory, i.e. along the frame guiding element 72, 84, towards the base 30. Thus the connecting point P is moved towards the frame guiding element 72, 84 along the curved trajectory.

Movement of the patient support device forwards from the upright position to the inclined position may be considered a movement along said curved trajectory, i.e. along the frame guiding element 72, 84, away from the base 30. Thus the connecting point P is moved away from the frame guiding element 72, 84 along the curved trajectory.

The patient support device 20 may be movable up to 45 degrees backwards or forwards to the inclined position relative the upright position about a horizontal axis.

More preferably, the patient support device 20 may be movable up to 30 degrees backwards or forwards to the inclined position relative the upright position about the horizontal axis.

It is particularly advantageous that the patient support device 20 is movably mounted to the frame 31 between an upright and an inclined position in which the patient support device 20 is inclined backwards relative to the upright position. This allows for the patient to maintain a comfortable position and a sense of safety.

In one embodiment, the patient support device 20 may comprise a seat supporting section 21. The seat supporting section 21 is adapted to support the rear of a patient. The patient support device 20 may further comprise a back supporting section 22. The back supporting section 22 is adapted to support the back of a patient.

The tilting of the patient support device 20 between the upright position and the inclined position allows for the sitting position of the patient to be maintained in a natural manner during movement of the patient support device.

In one embodiment, the patient support device 20 may be in the form of a chair support. The patient support device 20 is thus adapted to support a seated patient. Accordingly, the back supporting section 22 and the seat supporting section 21 may be substantially orthogonal to each other. In one embodiment, the patient support device 20 may further comprise a calf supporting section pivotally mounted to the seat supporting section 21. Said calf supporting section is adapted to support the calves of a patient supported by the patient support device 20.

In an alternative embodiment, the patient support device 20 may be a stretcher. Thus, the patient support device 20 may comprise a substantially planar member. Said substantially planar member is adapted to support a patient, i.e. a patient in a recumbent position.

Further referencing FIG. 1, the patient support device 20 has the back supporting section 22 and the seat supporting section 21. The support guiding element 71 is mounted to the back supporting section 22 of the patient support device 20.

The support guiding element 71 may be mounted to a top portion 23 of the back supporting section 22. In one embodiment, the top portion 23 is the uppermost portion of the back supporting section 23 when the patient support device 20 is in the upright position.

Having the top portion 23 fix to the support guiding element 71 ensures that all structural elements of the patient handling apparatus may be kept outside a bath tub during lifting and handling operations. This is achieved while the arched portion provides the desired pivoting movement of the patient support device 20.

The connecting point P may thus be arranged between the back supporting section 22 and the support guiding element 71. The connecting point P may further be arranged between the top portion 23 and the support guiding element 71.

In one embodiment, the top portion 23 may be further adapted to support the back of the head of a patient. Accordingly, said top portion 23 may constitute a neck support portion.

In one embodiment, the patient support device 20 is a substantially rigid patient support device. Thus, the patient support device 20 may be in a rigid material, such as plastic. For example, the patient support device 20 may be in the form of a rigid chair. In one embodiment, the rigid patient support device may be provided with padded sections for additional support. The substantially rigid patient support device 20 allows for a more stable movement of the patient by means of the patient handling apparatus compared to a flexible patient support device such as for example a patient sling.

The patient handling apparatus may be arranged such that the center of gravity of the patient supported by the patient support device is arranged with a horizontal offset relative the load bearing structure of the patient handling apparatus, i.e. the frame 31. Accordingly, the patient handling apparatus may be arranged such that the center of gravity of the patient supported by the patient support device is arranged at a horizontal distance from the load bearing structure of the patient handling apparatus, i.e. the frame 31. The moving of the patient at said offset increases the stability of the movement and allows for unobstructed lifting over obstacles such as beds. This may be achieved in a number of ways. In one embodiment, the frame guiding element 72, 84 is arranged at a horizontal distance from the patient support device 20 at least when the patient support device 20 is in the upright position. In one embodiment, the seat supporting section 21 is arranged at a horizontal distance from the guiding arrangement 70. In one embodiment, the connection point P is arranged at a horizontal distance from the seat supporting section 21. In one embodiment, the patient support device 20 is arranged at a horizontal distance in front of the guiding arrangement 70, the guiding arrangement 70 being arranged at a back portion of the patient handling apparatus.

Again referencing FIG. 1, the patient handling apparatus may further implement an arrangement for linear movement, i.e. raising and lowering of the patient support device 20. The patient handling apparatus 10 may comprise a translational arrangement 60. The translational arrangement 60 movably connects the patient support device 20 and the base 30. The translational arrangement 60 is adapted to guide raising and/or lowering of the patient support device 20 relative the base 30 in a vertical direction.

In one embodiment, the translational arrangement 60 and the guiding arrangement 70 are adapted to independently guide the movement of the patient support device 20 relative the frame 30. Hence, the position and/or orientation of the patient support device 20 may be adjusted by means of the translational arrangement 60 and the guiding arrangement 70. The adjustment of the patient support device 20 by means of the translational arrangement 60 is thus independent from the adjustment of said patient support device 20 by means of the guiding arrangement 70.

As depicted in FIG. 1, the translational arrangement 60 may be a telescopic arrangement. The translational arrangement 60 may comprise a support translational member 61 mounted to the patient support device 20 and a guiding translational member 62 mounted to the base 30. The support translational member 61 and the guiding translational member 62 are movably connected to allow relative vertical movement between said support translational member 61 and the guiding translational member 62. The guiding translational member may be comprised in the frame 31.

One of the support translational member 61 and the guiding translational member 62 may be hollow and adapted to receive the other of the support translational member 61 and the guiding translational member 62. In one embodiment, the support translational member 61 may be a hollow member and adapted to receive the guiding translational member 62. Thus, the guiding translational member 62 is arranged inside the support translational member 61. The support translational member 61 is thus movable relative the guiding translational member 62, said guiding translational member 62 being fix. Thereby, a more compact translational arrangement is achieved. Further, having the fix translational member arranged inside the movable translational member mitigates the risk for pinching.

In one embodiment, the patient handling apparatus 10 may further comprise a locking unit. The locking unit may be adapted to upon actuation prevent the relative movement between the support guiding element and the at least one frame guiding element.

The locking unit may thus be adapted to upon actuation prevent relative movement between the patient support device 20 and the base 30 by means of the guiding arrangement 70 and/or the translational arrangement 60.

The locking unit may be a friction lock such as a brake or a locking pin or any other mean known to the skilled person.

Further referencing FIG. 1, the guiding arrangement 70 may be in the form a gear rack interfacing with a pinion, i.e. a cogged wheel. Accordingly, one of the at least one frame guiding element 72 may comprise a curved gear rack 79. The support guiding element 71 may comprise a pinion 41 interfacing with said curved gear rack 79 (depicted in further detail in FIG. 3). The curved gear rack allows for the rotation of the patient support device around the center of mass of the patient. Thus, the patient support device may be moved between the upright and inclined position by a relatively small force.

The curved gear rack 79 may form the continuously arched portion. The curved gear rack 79 may form said continuously arched portion in itself or in conjunction with additional guiding elements.

Preferably, a toothed surface of the curved gear rack 79 interfacing with the pinion 41 may face the patient support device 20. This ensures that the engagement between the pinion and the gear rack is preserved, since movement of the patient handling apparatus will cause a contact force onto the pinion towards the gear rack.

Notably, in an alternative embodiment, the support guiding element 71 may comprise the continuously arched portion comprising the curved gear rack 79, whereby the frame guiding element 72 may comprise the pinion 41.

Again referencing FIG. 1, the patient handling apparatus may further comprise a casing 91. The casing 91 is mounted to the at least one frame guiding element 72, 84 or the support guiding element 71.

The casing 91 may be arranged to cover at least a portion of the other of the at least one frame guiding element 71 and the support guiding element 71 at least when the patient support device 20 is in the inclined position. The casing reduces the exposure of the moving parts of the patient handling apparatus, thus a safer patient handling apparatus is achieved.

Depending on the direction of the patient support device 20 relative the base, the casing 91 is arranged to cover the other of the at least one frame guiding element 72, 84 and the support guiding element 71 when the patient support device 20 is an inclined position which is backwards or forwards relative the upright position. Accordingly, the patient support device 20 may be adapted to support a patient facing away from the guiding arrangement or faces the guiding arrangement.

In one embodiment, the casing 91 may act as a part of the guiding arrangement 70 for further securing a robust and stable relative movement of the parts of the guiding arrangement. The casing 91 may form the continuously arched portion. The casing 91 may form said continuously arched portion in itself or in conjunction with guiding elements such as the previously described curved gear rack.

The support guiding element 71 may comprise the casing 91. One of the at least one frame guiding elements 84 may be arranged to be in contact with the casing 91 for guiding the relative movement between the support guiding element 71 and the frame guiding element 84. This will be further described with reference to FIG. 3.

In one embodiment, at least one frame guiding element may have a matching continuously arched portion in the form of an outer surface corresponding to the casing for guiding relative movement between the casing 91, i.e. the frame guiding element 84, and the support guiding element 71 by means of sliding contact between said casing and continuously arched portion. In one embodiment, a single frame guiding element 72, 84 may comprise said outer surface and the previously described curved gear rack. Accordingly, the single frame guiding element 72, 84 may comprise a first continuously arched portion comprising the outer surface and a second continuously arched position comprising the curved gear rack. In one embodiment, a first frame guiding element 84 may comprise said outer surface and a second frame guiding element 72 may comprise the curved gear rack. Accordingly, both the first and second frame guiding element may comprise a continuously arched portion.

In one embodiment, the patient handling apparatus 10 further comprises a drive unit 42 adapted to drive the support guiding element 71 relative the at least one frame guiding element 72. Thus, the patient support device 20 may be moved relative the base 30 both by means of manual operation and by means of the drive unit 42. In an alternative embodiment, the patient handling apparatus 10 may be solely manually operated and may thus not comprise said drive unit.

As depicted in FIG. 1, the at least one of the frame guiding element 72, 84 may have a first end 77 and a second end 78. The second end 78 may be opposite to the first end 77. The first end 77 may be a non-fixated end and the second end 78 may be mounted to the base 30 and more preferably the frame 31 of the base 30. Having the first end as a free end, i.e. floating end, allows better alignment between the parts of the guiding arrangement since the frame guiding element 72, 84 may flex slightly to guide the relative movement between the parts of the guiding arrangement.

In one embodiment, the first end 77 is a top end of the at least one of frame guiding element 72, 84. The second end 78 is a bottom end of the at least one frame guiding element 72, 84. The frame guiding element 72, 84 may thus extend in a vertical direction.

The at least one frame guiding element 72 may comprise the continuously arched portion. Further, the at least one frame guiding element 72 may comprise the curved gear rack 79. Extending along a portion of or the entire length of the frame guiding element 72.

In one embodiment, the patient handling apparatus may comprise a control unit and a user interface connected to said control unit. The control unit is connected to the drive unit 42 and configured to control said drive unit 42. The user interface is configured to receive a control signal based on user input, whereby the control unit is configured to control the drive unit based on said control signal.

Figure 2:
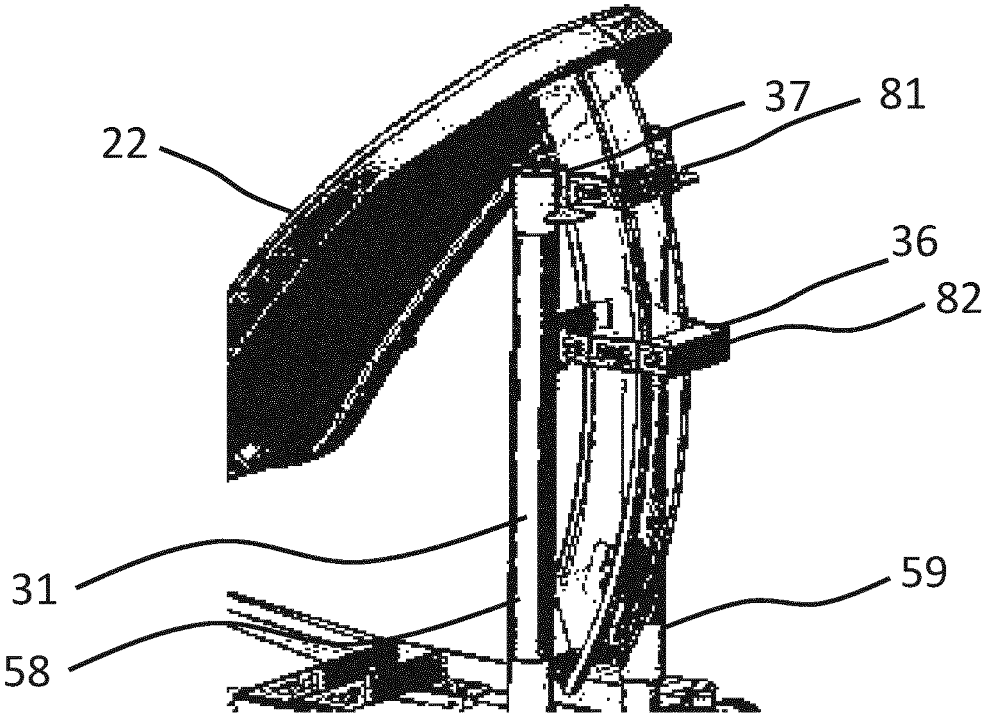
FIG. 2 is a perspective view of the guiding arrangement and the back supporting section of a patient handling apparatus according to an embodiment.
Figure 3:
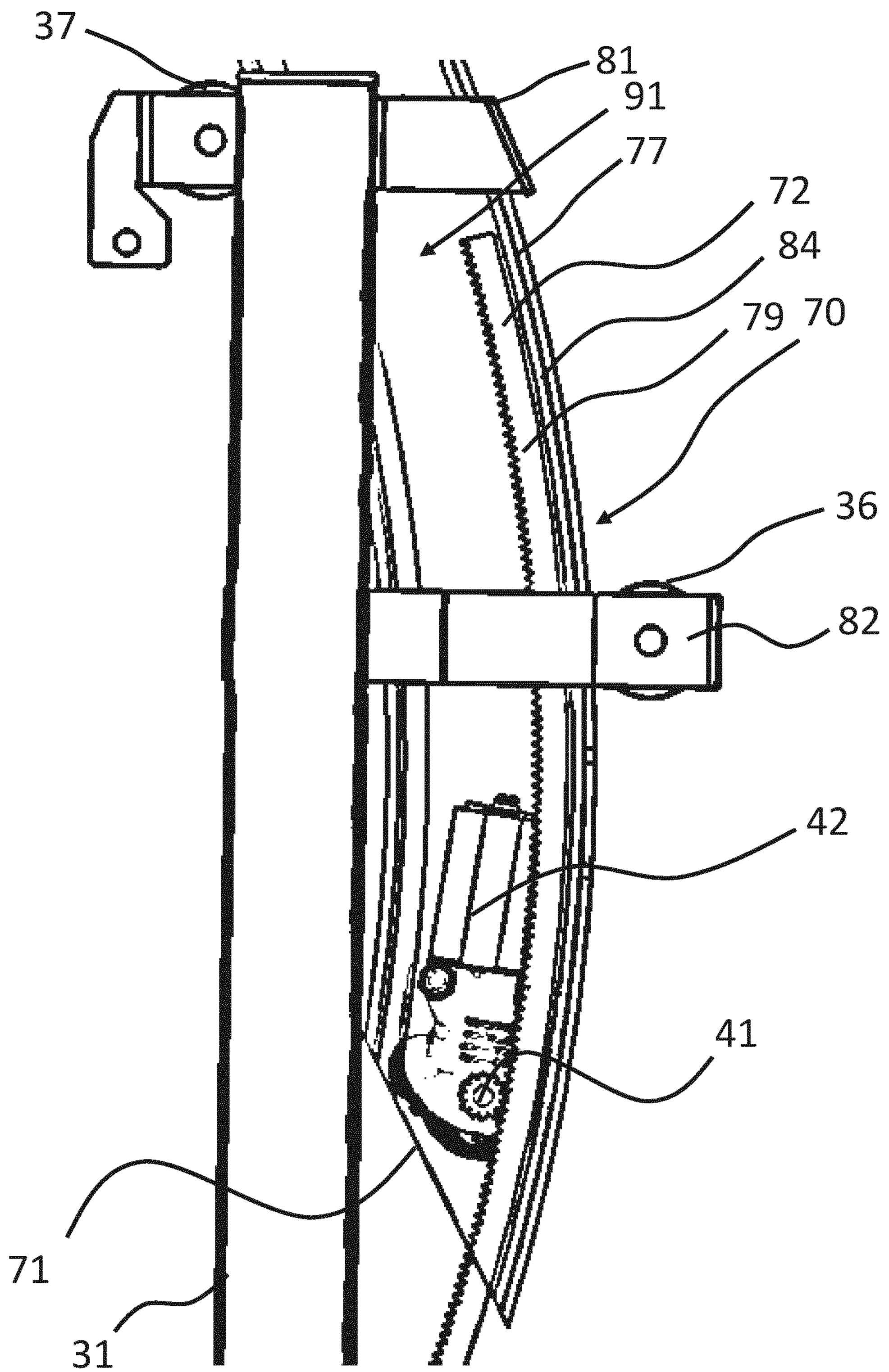
FIG. 3 is a partial cross-section of the guiding arrangement of a patient handling apparatus according to an embodiment.

Turning to FIGS. 2 and 3, a more detailed view of the guiding arrangement and the frame is depicted. In one embodiment, the patient handling apparatus 10 may comprise at least one support guide 36, 37 adapted to support the relative movement between the support guiding element 71 and the at least one frame guiding element 72, 84. In one embodiment, the at least one support guide 36, 37 is a roller. The support guide allows the guiding arrangement to carry higher loads without affecting the relative movement of its parts, since the support guide will effectively take up a portion of the load.

Further referencing FIG. 2, the at least one support guide 36, 37 may be arranged to unload the casing 91. The casing 91 may thus be in contact with said at least one support guide 36, 37. The casing 91 may be in rolling contact with the at least one support guide 36, 37.

Thus, the at least one support guide may constitute frame guiding elements.

The frame 31 may comprise at least one vertical column 58, 59. In one embodiment, the frame 31 may comprise a first and second vertical column 58, 59 extending orthogonally from the horizontal portion 39. The first and second vertical column 58, 59 may extend parallel and at a distance from each other. Both the first and second vertical column 58, 59 may be movably connected to the patient support device 20 via the translational arrangement 60.

The at least one frame guiding element 72, 84 with the continuously arched portion may extend between the vertical columns 58, 59 of the frame 31. Said frame guiding element 72, 84 may be attached to said vertical columns 58, 59 of the frame 31.

FIG. 3 depicts a partial cross-section of a part of the patient handling apparatus according to an embodiment. The patient handling apparatus is depicted when the patient support device is in the inclined position. Accordingly, the support guiding element 71 is in a lowered position relative the frame guiding element 72, 84, whereby the support guiding element 71 is in a raised position relative the frame guiding element 72, 84 when the patient handling apparatus 20 is in the upright position.

The drive unit 42 may be fix to one of the support guiding element 71 and the frame guiding element 72, 84. The drive unit 42 may comprise an electrical motor and a transmission for transferring torque to a driven member of guiding arrangement 70.

In one embodiment, the driven component of the guiding arrangement is the pinion 41. Thus the drive unit 42 connected to said pinion 41 and configured to transfer torque to said pinion 41.

Further referencing FIG. 3, the drive unit 42 is fix to the support guiding element 71. The drive unit 42 may be fix to the casing 91.

Accordingly, when the pinion 41 is driven by the drive unit 42 in a first rotational direction, the pinion 41 will climb upwards on the curved gear rack 79 causing movement of the patient support device towards the upright position. When the pinion 41 is driven by the drive unit 42 in a second rotational direction, the pinion will climb downwards on the curved gear rack 79 causing movement of the patient support device backwards towards the inclined position.

FIG. 3 depicts the at least one support guide 36, 37 in further detail.

A first support guide 36 may be mounted to the frame 31. The first support guide 36 may be arranged to guide the casing 91 by being in contact with a first outer surface of the casing 91. Said first outer surface of the casing 91 may be distal from the patient support device, i.e. facing away from the patient support device.

A second support guide 37 may be mounted to the frame 31. The second support guide 37 may be arranged to guide the casing 91 by being in contact with a second outer surface of the casing 91. Said second outer surface of the casing 91 may be proximal the patient support device, i.e. facing the patient support device.

Supporting both the first and second outer surface of the casing 91 is particularly advantageous, since it provides for unloading of the guiding arrangement resulting in a more robust and durable patient handling apparatus.

The first support guide 36 may be mounted to the frame 31 by means of a first frame element 82. The first support guide 36 is connected to the first support guide 36. In one embodiment, the first frame element 82 may comprise a U-shaped portion arranged to extend around the casing 91. This provides additional support for the guiding arrangement in case of impacts etc.

Correspondingly, the second support guide 37 may be mounted to the frame 31 by means of a second frame element 81. The second support guide 37 is connected to the second support guide 37. In one embodiment, the second frame element 81 may comprise a U-shaped portion arranged to extend around the casing 91. This provides additional support for the guiding arrangement in case of impacts etc.

In one embodiment, the first frame element 82 and the second frame element 81 may be mounted to the vertical columns 58, 59 of the frame 31. Accordingly, a first portion of the first frame element 82 may be mounted to the first vertical column 58 of the frame 31 and a second portion of the first frame element 82 may be mounted to the second vertical column 59 of the frame 31. Correspondingly, a first portion of the second frame element 81 may be mounted to the first vertical column 58 of the frame 31 and a second portion of the second frame element 81 may be mounted to the second vertical column 59 of the frame 31.

The invention has been described above in detail with reference to embodiments thereof. However, as is readily understood by those skilled in the art, other embodiments are equally possible within the scope of the present invention, as defined by the appended claims.

The invention claimed is:

1. A patient handling apparatus comprising a base with a frame and a patient support device, the patient support device being movable relative to the base, wherein the patient support device is movably mounted to the frame between an upright and an inclined position, in which the patient support device is inclined backwards or forwards in the inclined position relative to the upright position by means of a guiding arrangement, whereby said guiding arrangement comprises at least one frame guiding element mounted to the frame and a support guiding element mounted to the patient support device, wherein the support guiding element is movably connected to the frame guiding element and at least one of the at least one frame guiding element and the support guiding element has a continuously arched portion concave relative the patient support device in the upright position, said continuously arched portion being arranged to guide a relative movement between the support guiding element and the frame guiding element for providing movement of the patient support device between the upright and inclined position, and wherein one of the at least one frame guiding element comprises a curved gear rack and the support guiding element comprises a pinion interfacing with said curved gear rack, wherein a toothed surface of the curved gear rack interfacing with the pinion faces the patient support device, and wherein, upon movement of the patent handling apparatus, a contact force is caused onto the pinion towards the gear rack.

2. The patient handling apparatus according to claim 1, wherein the patient support device comprises a seat supporting section and a back supporting section having the support guiding element mounted to the back supporting section.

3. The patient handling apparatus according to claim 2, wherein the support guiding element is mounted to a top portion being the uppermost portion of the back supporting section when the patient support device is in the upright position.

4. The patient handling apparatus according to claim 1, further comprising a translational arrangement movably connecting the patient support device and the base, the translational arrangement being adapted to guide raising and/or lowering of the patient support device relative the base in a vertical direction.

5. The patient handling apparatus according to claim 4, wherein the translational arrangement and the guiding arrangement are adapted to independently guide the movement of the patient support device relative the frame.

6. The patient handling apparatus according to claim 1, wherein the patient support device is movable up to 45 degrees backwards or forwards to the inclined position relative the upright position about a horizontal axis.

7. The patient handling apparatus according to claim 1, further comprising a drive unit adapted to drive the support guiding element relative the at least one frame guiding element.

8. The patient handling apparatus according to claim 7, herein the drive unit is fixed to the support guiding element.

9. The patient handling apparatus according to claim 1, further comprising a casing mounted to the at least one frame guiding element or the support guiding element, the casing being arranged to cover at least a portion of the other of the at least one frame guiding element and the support guiding element at least when the patient support device is in the inclined position.

10. The patient handling apparatus according to claim 9, wherein the casing is arranged to cover the drive unit at least when the patient support device is in the inclined position.

11. The patient handling apparatus according to claim 10, wherein the support guiding element comprises the casing and one of the at least one frame guiding element is arranged to be in contact with the casing for guiding the relative movement between the support guiding element and said frame guiding element.

12. The patient handling apparatus according to claim 9, wherein the support guiding element comprises the casing and one of the at least one frame guiding element is arranged to be in contact with the casing for guiding the relative movement between the support guiding element and said frame guiding element.

13. The patient handling apparatus according to claim 1, wherein the at least one of the frame guiding element has a first end and a second end opposite to said first end, whereby the first end is a non-fixated end and the second end is mounted to the base.

14. The patient handling apparatus according to claim 13, wherein the first end is a top end of the at least one of frame guiding element and the second end is a bottom end of the at least one frame guiding element.

15. The patient handling apparatus according to claim 1, further comprising at least one support guide being a roller adapted to support the relative movement between the support guiding element and the at least one frame guiding element.

16. The patient handling apparatus according to claim 1, wherein the patient support device is mounted to the base solely by means of the guiding arrangement.

17. The patient handling apparatus according to claim 1, wherein the patient support device is movable up to 30 degrees backwards or forwards to the inclined position relative the upright position about a horizontal axis.

18. The patient handling apparatus according to claim 1, further comprising:

a first support guide mounted to the frame at a first location and supporting the relative movement between the support guiding element and the at least one frame guiding element; and a second support guide mounted to the frame at a second location and supporting the relative movement between the support guiding element and the at least one frame guiding element, wherein the first support guide is in contact with a first outer surface of the casing, the first outer surface of the casing facing away from the patient support device, and wherein the second support guide is in contact with a second outer surface of the casing, the second outer surface of the casing facing toward the patient support device.

19. The patient handling apparatus according to claim 18, wherein at least one of the first support guide and the second support guide are mounted to the frame by a frame element that includes a U-shaped portion extending around the casing.

* * * * *